US012755409B2

(12) United States Patent
Cavetchi et al.

(10) Patent No.: US 12,755,409 B2
(45) Date of Patent: Oct. 6, 2026

(54) DEVICE AND METHOD FOR DETERMINING THE DISTANCE OF A LIGHT SIGNAL TRANSMITTER BASED ON MACHINE-LEARNED FUSION OF INDIVIDUAL DISTANCE ESTIMATES OF OBJECT AND LIGHT SIGNAL TRANSMITTER FROM VEHICLE

(71) Applicant: Bayerische Motoren Werke Aktiengesellschaft, Munich (DE)

(72) Inventors: Reinhard Cavetchi, Hallbergmoos (DE); Michel Lanz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 248 days.

(21) Appl. No.: 18/703,447

(22) PCT Filed: Nov. 3, 2022

(86) PCT No.: PCT/EP2022/080636

§ 371 (c)(1),
(2) Date: Apr. 22, 2024

(87) PCT Pub. No.: WO2023/078974

PCT Pub. Date: May 11, 2023

(65) Prior Publication Data

US 2024/0428433 A1 Dec. 26, 2024

(30) Foreign Application Priority Data

Nov. 5, 2021 (DE) ..................... 10 2021 128 785.5

(51) Int. Cl.
*G06T 7/521* (2017.01)
*G06T 7/20* (2017.01)
(Continued)

(52) U.S. Cl.
CPC .............. *G06T 7/521* (2017.01); *G06T 7/269* (2017.01); *G06T 7/50* (2017.01); *G06T 7/20* (2013.01);
(Continued)

(58) Field of Classification Search
CPC .. G06T 7/20; G06T 7/269; G06T 7/50; G06T 7/521; G06T 2207/10028; G06T 2207/20084; G06T 2207/30252
See application file for complete search history.

(56) References Cited

U.S. PATENT DOCUMENTS 6,445,809 B1 * 9/2002 Sasaki .................. G06V 20/588 382/104
9,715,634 B2 * 7/2017 Mielenz .................. G01C 3/08
(Continued)

FOREIGN PATENT DOCUMENTS

DE 10 2013 001 018 A1 7/2014
DE 10 2013 019 550 B3 1/2015
(Continued)

OTHER PUBLICATIONS

International Search Report (PCT/ISA/210) issued in PCT Application No. PCT/EP2022/080636 dated Mar. 2, 2023 with English translation (7 pages).
(Continued)

*Primary Examiner* — Scott A Rogers
(74) *Attorney, Agent, or Firm* — Crowell & Moring LLP

(57) ABSTRACT

An apparatus for determining an estimated value of the distance of a light signal transmitter from a motor vehicle is described. The apparatus is configured, based on image data from a camera of the vehicle, to recognize a number of objects in an environment of the light signal transmitter arranged in front of the vehicle in the direction of travel, and to assign at least one object from the number of objects to
(Continued)

the signal transmitter. The apparatus is further configured to determine an individual estimated value of the distance of the at least one assigned object from the vehicle, and to determine the estimated value of the distance of the light signal transmitter based on the individual estimated value of the distance of the at least one assigned object from the vehicle.

10 Claims, 2 Drawing Sheets

(51) Int. Cl.
*G06T 7/269* (2017.01)
*G06T 7/50* (2017.01)

(52) U.S. Cl.
CPC ............... *G06T 2207/10028* (2013.01); *G06T 2207/20084* (2013.01); *G06T 2207/30252* (2013.01)

(56) References Cited

U.S. PATENT DOCUMENTS 9,798,951 B2* 10/2017 Won ........................ G06T 7/269
10,507,807 B2* 12/2019 Ben Shalom ............. B60T 7/12
12,505,676 B2* 12/2025 Von Radziewsky ... G06V 20/58
12,534,081 B2* 1/2026 Hempel ................ B60W 10/18
2005/0111697 A1* 5/2005 Yamamoto .............. G06T 7/269 382/103
2014/0348238 A1* 11/2014 Morphet ................ H04N 19/51 375/240.16
2017/0285161 A1* 10/2017 Izzat ..................... G01S 17/931
2020/0233087 A1* 7/2020 Sekiguchi ............... G01S 17/34
2021/0088331 A1* 3/2021 Nagori ................... G06V 20/56
2021/0261152 A1 8/2021 Meijburg et al.
2021/0272306 A1 9/2021 Jiang et al.
2021/0287387 A1* 9/2021 Deegan ..................... G06T 7/10
2023/0085024 A1* 3/2023 Zhang ........................ G06T 7/20 382/103
2023/0148097 A1* 5/2023 Miyake ................. G01S 13/867 348/148

FOREIGN PATENT DOCUMENTS

DE 10 2015 216 979 A1 2/2017
WO WO 2011/091099 A1 7/2011

OTHER PUBLICATIONS

German-language Written Opinion (PCT/ISA/237) issued in PCT Application No. PCT/EP2022/080636 dated Mar. 2, 2023 with English translation (9 pages).
German-language Search Report issued in German Application No. 10 2021 128 785.5 dated Jun. 15, 2022 with partial English translation (12 pages).
Dabisias, G. et al., "VALUE: Large Scale Voting-Based Automatic Labelling for Urban Environments", 2018 IEEE International Conference on Robotics and Automation (ICRA), IEEE, May 21, 2018, pp. 6033-6038, XP033403017 (6 Pages).
Korean-language Office Action issued in Korean Application No. 10-2024-7012955 dated Apr. 9, 2026 with English translation (19 pages).

* cited by examiner

DEVICE AND METHOD FOR DETERMINING THE DISTANCE OF A LIGHT SIGNAL TRANSMITTER BASED ON MACHINE-LEARNED FUSION OF INDIVIDUAL DISTANCE ESTIMATES OF OBJECT AND LIGHT SIGNAL TRANSMITTER FROM VEHICLE

BACKGROUND AND SUMMARY

The invention relates to a device and a corresponding method for determining the distance of a light signal transmitter from a motor vehicle.

A vehicle can have one or more driving functions which assist the driver of the vehicle in the guidance, in particular in the longitudinal guidance and/or the lateral guidance, of the vehicle. One exemplary driving function for assisting the longitudinal guidance of a vehicle is the adaptive cruise control (ACC) function, which can be used to longitudinally guide the vehicle at a defined set driving speed and/or at a defined target distance from a front vehicle driving in front of the vehicle. The driving function can also be used here in conjunction with a light signal transmitter (in particular with a traffic signal) at a traffic node point (for example, at an intersection), in order to effectuate automated longitudinal guidance, such as an automated deceleration, at the light signal transmitter.

In the scope of the automated longitudinal guidance at a light signal transmitter, typically an estimated value of the distance of the light signal transmitter from the vehicle is determined, for example, to define the extent of the automated deceleration and/or to define the starting time or the starting position for the automated deceleration.

The present document relates to the technical problem of determining the estimated value for the distance of a light signal transmitter of a light signal system in an efficient and precise manner, in particular to increase the quality of a driving function of the automated longitudinal guidance at the light signal system.

The object is achieved by each individual one of the independent claims. Advantageous embodiments are described, inter alia, in the dependent claims. It is to be noted that additional features of a claim dependent on an independent claim, without the features of the independent claim or in combination with only a subset of the features of the independent claim, can form a separate invention independent of the combination of all features of the independent claim, which can be made the subject matter of an independent claim, a divisional application, or a subsequent application. This applies in the same manner to technical teachings described in the description, which can form an invention independent of the features of the independent claims.

According to one aspect, a device for determining an estimated value of the distance of a light signal transmitter from a motor vehicle is described. The light signal transmitter can be arranged in the direction of travel in front of the vehicle and the vehicle can move toward the light signal transmitter at a specific travel speed (for example, greater than 0 km/h, in particular greater than 30 km/h). The light signal transmitter can be part of a light signal system which has one or more light signal transmitters (for example, for one or more different directions of travel). The light signal transmitter can be arranged at a traffic node point, in particular at an intersection. Furthermore, the light signal transmitter typically has one or more light signs, each of which can be activated or deactivated individually. The different light signs can have different colors (such as red, yellow, or green). The light signal transmitter can be a traffic signal.

The device is configured to recognize a set of objects in the surroundings of the light signal transmitter arranged in the direction of travel in front of the vehicle on the basis of image data of a camera of the vehicle. Furthermore, the light signal transmitter itself can also be recognized on the basis of the image data. The image data can comprise a sequence of chronologically successive images. The individual images can be analyzed (for example, on the basis of a (possibly machine-trained) image analysis method), in order to identify one or more objects in the direct surroundings of the light signal transmitter. Object information can be determined for each of the individual objects. The object information for an object can comprise, for example, the position of the object (relative to the signal transmitter), the dimensions of the object (for example, the width and/or the height), and/or the type of the object.

Exemplary types of objects are: a ground marking, in particular a stopping line, in the surroundings of the signal transmitter; a traffic sign in the surroundings of the signal transmitter; an intersecting lane at the node point, at which the signal transmitter is arranged; a vehicle standing at the signal transmitter; and/or a (horizontal or vertical) mast, to which the signal transmitter is fastened.

For example, on the basis of the image data, an image can be determined from the sequence of images which (superimposed with the image acquired by the camera) has a set of bounding boxes for the corresponding set of objects. One bounding box can enclose one object in each case. Furthermore, the object information for this object can be associated with the bounding box for an object.

The device is furthermore configured to assign at least one object from the set of objects to the signal transmitter. In particular, the one or more objects from the set of objects can be assigned which are (probably) closest to the signal transmitter (and thus have a similar distance from the vehicle). Alternatively or additionally, one or more objects can be assigned which are larger and/or more highly visible than the signal transmitter.

The at least one object from the set of objects can be assigned to the signal transmitter in particular on the basis of a machine-trained assignment unit. The assignment unit can comprise a trained, artificial neural network (in particular a so-called deep neural network).

The assignment unit can have been trained on the basis of training data, wherein the target function of the assignment unit is (statistically) described by the training data. The target function can be directed here to identifying, from a set of recognized objects which are arranged in the surroundings of a signal transmitter, the N objects which each have a distance which is most similar to the distance of the signal transmitter. N can be, for example, 1, 2, 3, or 4.

The training data can have a large number of training data sets (for example, 1000 or more or 10,000 or more data sets). Each training data set can respectively have input data (as the input for the assignment unit) and target output data (which are supposed to be provided for the corresponding input data at the output of the assignment unit). The input data can comprise, for example, a set of objects in the surroundings of a signal transmitter which were recognized on the basis of image data. The target output data can indicate, for example, the one or more objects from the set of objects which are supposed to be used for determining the distance of the signal transmitter (for example, because they each have a particularly similar distance to the distance of the signal transmitter).

The input data can each have, for example, an image of a vehicle camera, wherein the individual recognized objects can be marked in the image (for example in each case as bounding boxes). Furthermore, the object information of the individual objects can be transferred as input data to the assignment unit. As output data, the one or more objects from the set of objects on the image of the vehicle camera, which are assigned to the signal transmitter, can be identified by the assignment unit. Therefore, a classification of the set of recognized objects can be effectuated by the assignment unit, into the classes "assigned" and "not assigned".

The device is furthermore configured (in particular on the basis of the image data) to determine an individual estimated value of the distance of the at least one assigned object from the vehicle. Therefore, for each assigned object, an individual estimated value of the distance of the respective object can be determined in each case. The individual estimated value of the distance of an object from the vehicle can be determined by means of a structure-from-motion method on the basis of the image data, in particular on the basis of the sequence of images. Alternatively or additionally, an optical flow can be determined on the basis of the sequence of images and the individual estimated value of the distance of the respective object from the vehicle can be determined on the basis of the optical flow.

An image analysis method can thus be used in order to determine an individual estimated value of the distance of the assigned object from the vehicle in each case on the basis of the image data for each individual assigned object.

The device is furthermore configured to determine the estimated value of the distance of the light signal transmitter on the basis of the individual estimated value of the distance of the at least one assigned object from the vehicle.

As described above, an assigned object in the direct surroundings of the signal transmitter is preferably possibly larger and/or more highly visible than the signal transmitter. As a result, the distance of the assigned object can typically be determined with increased accuracy on the basis of the image data of the vehicle camera. Therefore, the distance of the signal transmitter can be determined with increased accuracy based thereon.

The device can be configured to determine an individual estimated value of the distance of the light signal transmitter from the vehicle (in particular on the basis of the image data). The individual estimated value of the distance of the light signal transmitter from the vehicle can be determined, for example, by means of a structure-from-motion method on the basis of the image data, in particular on the basis of the sequence of images. Alternatively or additionally, the individual estimated value of the distance of the light signal transmitter from the vehicle can be determined on the basis of the optical flow.

The estimated value of the distance of the light signal transmitter can then also be determined on the basis of the individual estimated value of the distance of the light signal transmitter from the vehicle (for example, on the basis of an averaging and/or fusion method). The accuracy of the estimated value of the distance of the light signal transmitter can thus be further increased.

Therefore, individual estimated values of the distances of one or more objects in the surroundings of the signal transmitter and an individual estimated value of the distance of the signal transmitter can be determined. The individual estimated values can be fused by means of a (machine-trained) fusion unit to form an estimated value of the distance of the light signal transmitter. The fusion unit can comprise, for example, a trained neural network. The training can have been carried out on the basis of training data using a large number of data sets, wherein the target function of the fusion unit is (statistically) described by the training data. The target function can be a fusion of the individual estimated values, by way of which a particularly precise estimated value of the distance of the light signal transmitter results. A data set can have individual estimated values as input data of the fusion unit. Furthermore, the data set can indicate the estimated value of the distance of the signal transmitter as the output data of the fusion unit, which is supposed to be provided on the basis of the individual estimated values of the corresponding input data by the fusion unit.

The device can be configured to determine an individual estimated value of the distance of the assigned object from the light signal transmitter. The individual estimated value of the distance of the assigned object from the light signal transmitter can be determined, for example, by means of a structure-from-motion method on the basis of the image data. Alternatively or additionally, the individual estimated value of the distance of the assigned object from the light signal transmitter can be determined on the basis of the optical flow.

The estimated value of the distance of the light signal transmitter can then also be determined on the basis of the individual estimated value of the distance of the assigned object from the light signal transmitter. The accuracy of the estimated value of the distance of the light signal transmitter can thus be further increased.

The one or more assigned objects can have a larger spatial extension than the light signal transmitter. This can promote the fusion with sensor data from one or more further surroundings sensors of the vehicle, by which the accuracy of an individual estimated value of the distance of the assigned object and/or the accuracy of the estimated value of the distance of the light signal transmitter can be further increased.

The device can therefore be configured, by means of one or more further surroundings sensors of the vehicle, in particular by means of a lidar sensor and/or by means of a radar sensor, to determine sensor data with respect to an assigned object. The individual estimated value of the distance of the assigned object from the vehicle can then (also) be determined on the basis of the sensor data of the one or more surroundings sensors. In particular, a fusion of the sensor data of the one or more surroundings sensors with the image data can take place.

The device can be configured to longitudinally guide the vehicle in an automated manner as a function of the determined estimated value of the distance of the light signal transmitter. In particular, the point in time and/or the extent of an automated deceleration of the vehicle can be determined and/or effectuated as a function of the determined estimated value of the distance of the light signal transmitter. The quality of the automated longitudinal guidance can be increased by the increased accuracy of the estimated value.

Furthermore, the device can be configured (in particular on the basis of the image data) to determine the signaling state of the light signal transmitter (for example, red or green). The vehicle can then be automatically decelerated as a function of the signaling state (for example, in the case of red), in order to bring the vehicle to a standstill in front of the light signal transmitter. On the other hand, the vehicle can automatically be guided past the light signal transmitter (for example, in the case of green). By taking the signaling state of the signal transmitter into consideration, the quality of the automated longitudinal guidance can be further increased.

According to a further aspect, a (road) motor vehicle is described (in particular a passenger vehicle or a truck or a bus or a motorcycle), which comprises the device described in this document.

According to a further aspect, a method for determining an estimated value of the distance of a light signal transmitter from a motor vehicle is described. The method comprises recognizing, on the basis of image data of a camera of the vehicle, a set of objects in the surroundings of the light signal transmitter arranged in the direction of travel in front of the vehicle, and assigning at least one object from the set of objects to the signal transmitter. In addition, the method comprises determining, in particular on the basis of the image data, an individual estimated value of the distance of the assigned object from the vehicle. The method furthermore comprises determining the estimated value of the distance of the light signal transmitter on the basis of the individual estimated value of the distance of the assigned object from the vehicle.

According to a further aspect, a software (SW) program is described. The SW program can be configured to be executed on a processor (for example on a control device of a vehicle), and to thus carry out the method described in this document.

According to a further aspect, a storage medium is described. The storage medium can comprise a SW program, which is configured to be executed on a processor and to thus carry out the method described in this document.

It is to be noted that the methods, devices, and systems described in this document can be used both alone and in combination with other methods, devices, and systems described in this document. Furthermore, any aspects of the methods, devices, and systems described in this document can be combined with one another in a variety of ways. In particular, the features of the claims can be combined with one another in a variety of ways. Furthermore, features set forth between parentheses are to be understood as optional features.

The invention will be described in more detail hereinafter on the basis of exemplary embodiments. In the figures

DETAILED DESCRIPTION OF THE DRAWINGS

As described at the outset, the present document relates to determining the distance of a light signal system, which is arranged in front of a vehicle in the direction of travel, in an efficient and precise manner. The distance is preferably to be determined here solely on the basis of the image data of a camera of the vehicle. The distances described in this document can relate to a distance along the direction of travel of the vehicle. Alternatively or additionally, the distances between two entities can relate to the respective shortest distance between the two entities.

Figure 1:
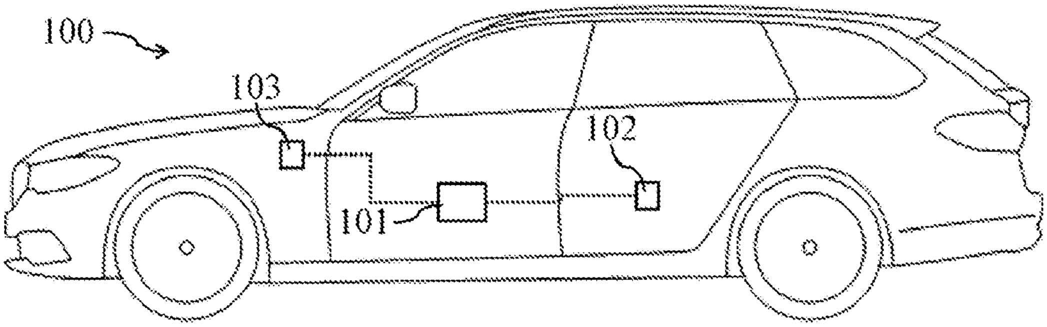
FIG. 1 shows exemplary components of a vehicle.

FIG. 1 shows exemplary components of a vehicle 100. The vehicle 100 comprises one or more surroundings sensors 103 (e.g., one or more image cameras, one or more radar sensors, one or more lidar sensors, one or more ultrasonic sensors, etc.), which are configured to acquire surroundings data with respect to the surroundings of the vehicle 100 (in particular with respect to the surroundings in front of the vehicle 100 in the direction of travel). Furthermore, the vehicle 100 comprises one or more actuators 102, which are configured to act on the longitudinal and/or the lateral guidance of the vehicle 100. Exemplary actuators 102 are: a braking system, a drive motor, a steering system, etc.

The (control) device 101 of the vehicle 100 can be configured to provide a driving function, in particular a driver assistance function, on the basis of the sensor data of the one or more surroundings sensors 103 (i.e., on the basis of the surroundings data). For example, an obstacle on the travel trajectory of the vehicle 100 can be recognized on the basis of the sensor data. The control unit 101 can thereupon activate one or more actuators 102 (such as the braking system) to automatically decelerate the vehicle 100 and thus prevent a collision of the vehicle 100 with the obstacle.

In particular in the scope of the automated longitudinal guidance of a vehicle 100, in addition to a front vehicle, one or more light signal systems on the roadway or street traveled by the vehicle 100 can be taken into consideration. In particular the status of a light signal or traffic signal system can be taken into consideration, so that the vehicle 100 automatically causes a deceleration up to the stopping line of the traffic signal at a red traffic signal relevant for the ego (planned) direction of travel and/or accelerates (possibly again) at a green traffic signal.

Figure 2:
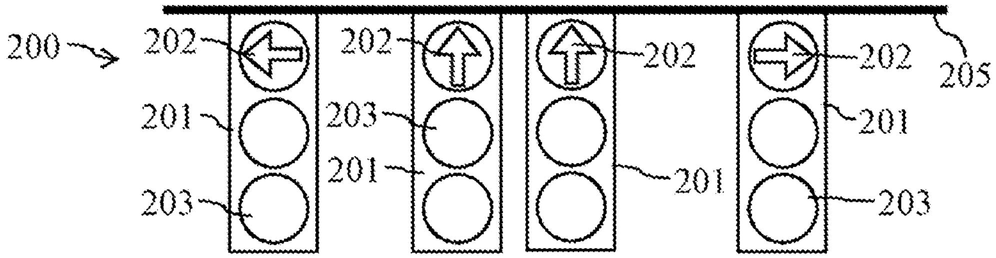
FIG. 2 shows an exemplary light signal system.

FIG. 2 shows an exemplary light signal system 200. The light signal system 200 shown in FIG. 2 has four different signal transmitters 201, which are arranged at different positions at an approach to an intersection. The left signal transmitter 201 has an arrow 202 to the left, and thus indicates that this signal transmitter 201 applies to those turning left. The two middle signal transmitters 201 have an arrow 202 upward (or no arrow 202) and thus indicate that these two signal transmitters 201 apply for driving straight ahead. The individual light signs 203 of these two signal transmitters 201 form signal groups. Furthermore, the right signal transmitter 201 has an arrow 202 to the right, and thus indicates that this signal transmitter 201 applies to those turning right.

Figure 3:
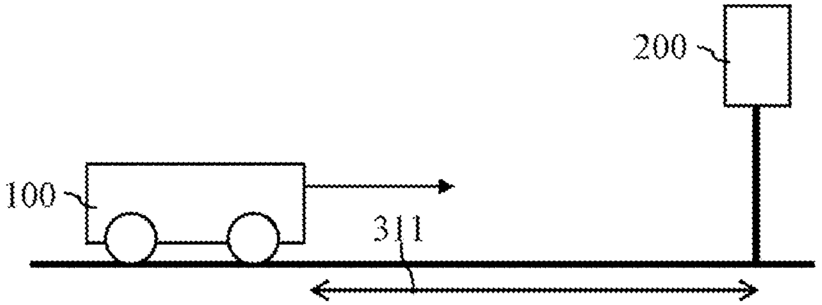
FIG. 3 shows an exemplary traffic situation.

FIG. 3 shows a vehicle 100 by way of example, which moves on a roadway toward a light signal system 200. The one or more surroundings sensors 103 of the vehicle 100 can be configured to acquire sensor data (in particular image data) with respect to the light signal system 200. The sensor data can then be analyzed (for example, by means of an image analysis algorithm) to determine expressions of one or more features of the light signal system 200. In particular, it can be determined on the basis of the sensor data which signal transmitter 201 of the light signal system 200 is relevant for the (planned) direction of travel of the vehicle 100. Furthermore, the (signaling) state of the relevant signal transmitter 201 can be determined (for example, the color, such as red, yellow, or green). In addition, the distance 311 of the light signal system 200 from the vehicle 100 can be determined.

The recognition, the classification, and/or the positioning of the light signal transmitters 201 can be carried out on the basis of the image data of a camera 103. Methods can be used here which are based on "structure from motion" and/or on the evaluation of the optical flow in a sequence of images. Furthermore, the tracking of a recognized light signal transmitter 201 over time can take place on the basis of a Kalman filter. To determine an absolute value of the distance 311, heuristics can be used with respect to the typical size of light signal transmitters 291 (for example, a typical height and/or width). In a stereo camera system, in addition the parallaxes between the two cameras of the stereo camera system can be used for a (scaled) distance estimation.

The estimated value of the distance 311 of a light signal system 200 determined on the basis of the abovementioned methods can have a relatively high level of inaccuracy in particular at a relatively long distance 311 (for example, at 80 m or more) and/or at a relatively high travel speed (for example, at 70 km/h). The inaccuracy can possibly be sufficiently high that a light signal system 200 recognized on the basis of the image data cannot unambiguously be assigned to a light signal system mapped in a digital map or is incorrectly assigned to a mapped light signal system. In addition, at a relatively high travel speed, a relatively high recognition range of a signal transmitter 201 is typically required (for example, up to 250 m) in order to enable comfortable and/or reliable consideration of the signal transmitter 201 in the automated longitudinal guidance. As a result thereof, the quality of an automated driving function of the vehicle 100 can be impaired.

Exemplary causes of the inaccuracy of a determined distance estimated value can be

- a relatively low resolution and/or a relatively small number of pixels of a light sign 203 of a light signal transmitter 201 at relatively long distances 311. This can have the result that a deviation of the image evaluation by only one pixel results in a relatively strong effect in the distance estimation.
- A relatively low optical flow, in particular if the light signal transmitter 201 is located in the center point of the image acquired by a camera 103.
- An erroneous assumption with respect to the size of a light signal transmitter 201. A light signal transmitter 201 is often arranged in front of the sky as a background, so that only relatively few reference points are arranged in the image area of the light signal transmitter 201.
- An erroneous assumption with respect to the size of a light signal transmitter 201 due to effects of lens flares and/or blur (with a wet windshield, in twilight, or at night).

In a situation with little ambient light, possibly only the active light sign 203 can be recognized, and no longer the entire light signal transmitter 201. As a result thereof, the available number of pixels of the light signal transmitter 201 is further reduced.

Figure 4:
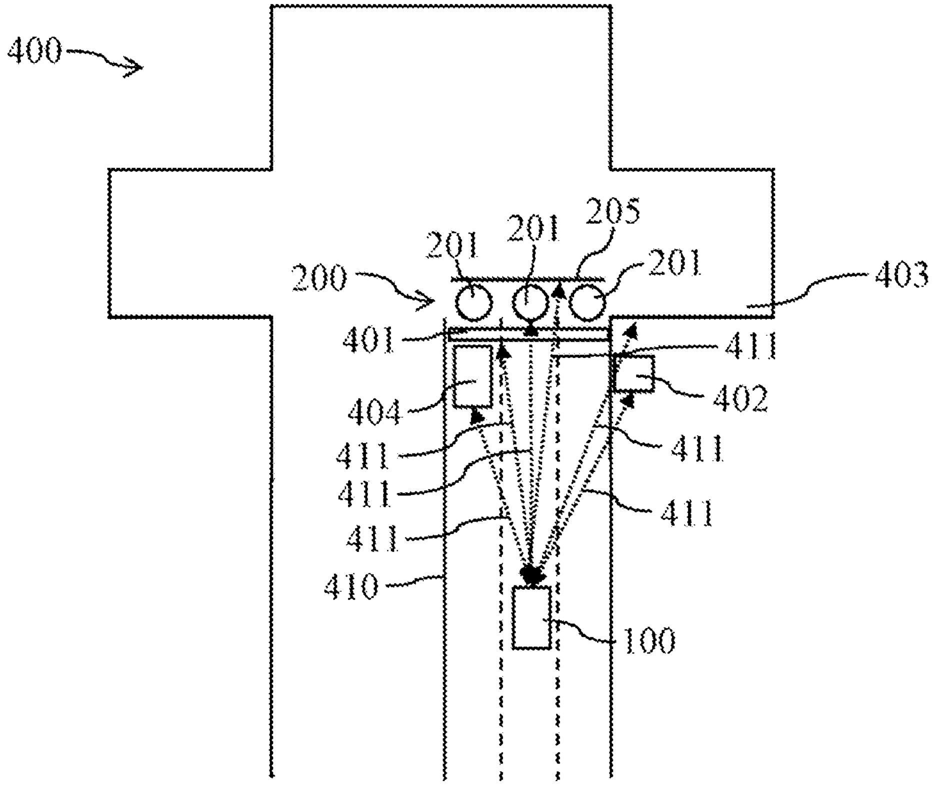
FIG. 4 shows an exemplary node point.

FIG. 4 shows an exemplary node point 400 with a light signal system 200. The light signal system 200 can comprise multiple signal transmitters 201 here, each having one or more light signs 203, which are possibly assigned to different directions of travel. The vehicle 100 is arranged on an approach 410 to the node point 400 and can be configured to acquire surroundings data with respect to the surroundings of the vehicle 100. The surroundings data (in particular the image data of a camera) can indicate the light signal system 200 (in particular the one or more signal transmitters 201 and/or the one or more light signs 203 of the light signal system 200) at the approach 410 to the node point 400, in particular to the intersection. Furthermore, one or more further objects 401, 402, 403, 404, 205 (in particular one or more landmarks) in the surroundings of the vehicle 100, in particular at the node point 400, can be indicated by the one or more surroundings sensors 103 of the vehicle 100. Exemplary objects are

- a stopping line 401 at the light signal system 200;
- a traffic sign 402 in the surroundings of the light signal system 200;
- a mast 205, on which the one or more signal transmitters 201 of the light signal system 200 are fastened; wherein the mast 205 can be arranged vertically or horizontally;
- a lane 403 intersecting the approach 410; and/or
- a vehicle 404 standing at the light signal system 200.

The (control) device 101 can be configured to assign one or more objects 401, 402, 403, 404, 205 recognized on the basis of the surroundings data (in particular on the basis of the image data) to the light signal system 200, in particular the light signal transmitter 201, for which an estimated value of the distance 311 is to be determined. In particular the one or more objects can be assigned here which are arranged with a relatively high probability in direct proximity to the light signal system 200 and/or which with a relatively high probability have a similarly long distance 411 from the vehicle 100.

The assignment of one or more of the recognized objects 401, 402, 403, 404, 205 to the light signal system 200 can be effectuated on the basis of a machine-trained assignment unit. The assignment unit can comprise, for example, a trained artificial neural network (in particular a deep neural network).

Training data having a large number of training data sets can be used to train the assignment unit. A training data set can have as input data a list of objects 401, 402, 403, 404, 205 in the surroundings of a light signal system 200. Furthermore, the training data set can have a classification as to which of the objects from the list of objects 401, 402, 403, 404, 205 are to be assigned to the light signal system 200 as target output data for the assignment unit.

The assignment unit can be trained on the basis of a learning algorithm (for example, on the basis of a back propagation algorithm) in order to cause the assignment unit to have the classification behavior described by the training data.

An image of the surroundings camera 103 can optionally be transferred as input data to the assignment unit, wherein the one or more recognized objects 401, 402, 403, 404, 205 in the surroundings of a light signal system 200 are identified in the image (for example, in each case as a bounding box). The assignment of the one or more objects can then be provided as output data.

The (control) device 101 can furthermore be configured to determine object distance information for each of the one or more objects 401, 402, 403, 404, 205 which were assigned to a recognized light signal system 200. The object distance information for an object 401 can have an (individual) estimated value of the distance 411 of the object 401 from the vehicle 100. The (individual) estimated value of the distance 411 can be determined on the basis of the surroundings data, in particular on the basis of the image data. The abovementioned methods can be used here, which are based on a structure-from-motion analysis and/or on an analysis of the optical flow. Alternatively or additionally, surroundings data from one or more further surroundings sensors 103 can be used (such as a lidar sensor and/or a radar sensor). A fusion can thus take place with sensor data from one or more further surroundings sensors 103 (which is possible in particular with a relatively large object 401, and thus enables a particularly precise distance estimation).

Therefore (in addition to an individually determined (individual) estimated value of the distance 411 of the signal transmitter 201), one or more individually determined (individual) estimated values of the distances 411 of one or more objects 401, 402, 403, 404, 205 (assigned to the signal transmitter 201) can be determined. Based on the plurality of individually determined individual estimated values of the distances 411, the overall estimated value of the distance 311 of the signal transmitter 201 or the signal system 200 can then be determined with increased accuracy. For this purpose, for example, a (weighted) averaging of the individual estimated values of the distances 411 can take place. Alternatively or additionally, a (machine-trained) fusion unit can be used to determine the overall estimated value of the distance 311 on the basis of the individual estimated values of the distances 411.

A context-based recognition and assignment of objects (in particular of landmarks) to an intersection scene can thus be carried out. A deep learning method can be used for this purpose. Objects including one or more light signal systems 200 can be assigned here to a detected location classified as an intersection 400.

A fusion of distance measurements can be carried out based on the assigned objects. The distance estimation can thus be supplemented with additional reference measurements (between vehicle 100 and object and between object and light signal system 200). The accuracy of the estimated value of the distance 311 of a light signal transmitter 200 can be increased by the consideration of relatively large objects (with an increased number of pixels) and/or by the consideration of one or more further adjacent light signal transmitters 200. The consideration of a relatively large object, which is possibly arranged at the edge of an image, enables the use of a relatively large optical flow for the determination of the distance estimated value, which in turn enables an accelerated convergence of the Kalman filter. Exemplary objects which can be taken into consideration are: traffic signs 402 (e.g., stop sign, yield sign) and/or direction indicators; horizontal and vertical masts 205; another light signal system and/or another light signal transmitter 201 at the traffic node point 400; a ground marking (for example, stopping line 401); a stationary vehicle 404; an intersecting lane 403; etc.

Figure 5:
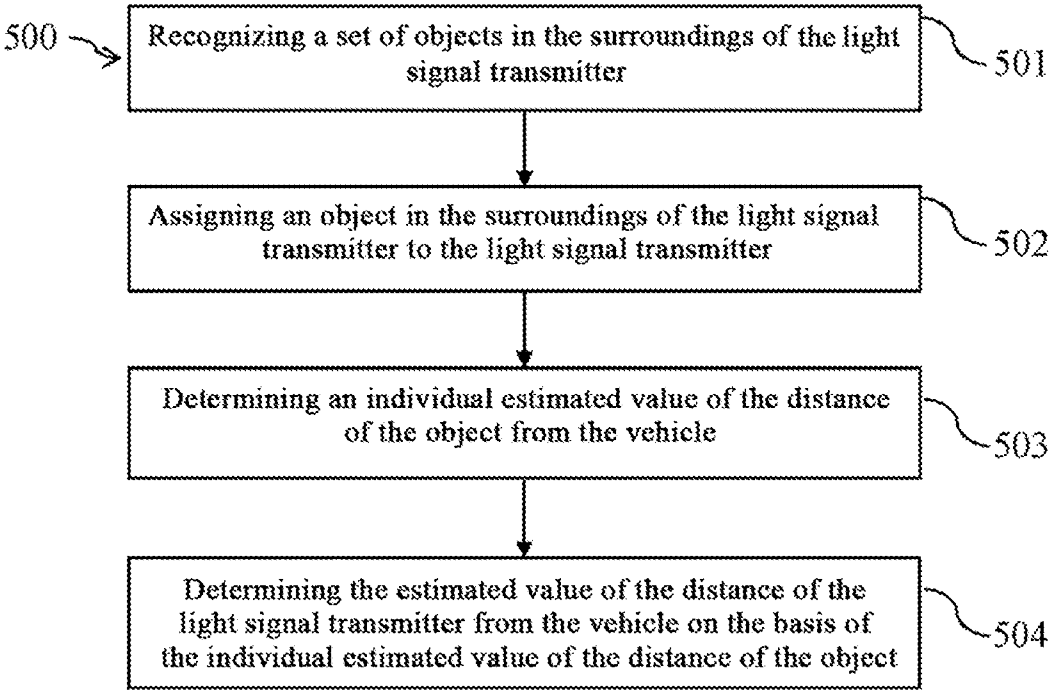
FIG. 5 shows a flow chart of an exemplary method for determining an estimated value of the distance of a light signal system.

FIG. 5 shows a flow chart of an exemplary (possibly computer implemented) method 500 for determining an estimated value of the distance 311 of a light signal transmitter 201 from a motor vehicle 100. The light signal transmitter 201 can be part of a light signal system 200 having one or more light signal transmitters 201. The light signal transmitter 201 can have one or more light signs 203, which can each be activated (so that light is emitted) or deactivated (so that no light is emitted) individually.

The method 500 comprises recognizing 501, on the basis of image data of (at least) one camera 103 of the vehicle 100, a set of objects 401, 402, 403, 404, 205 in the surroundings of the light signal transmitter 201 arranged in front of the vehicle 100 in the direction of travel. An object recognition algorithm can be applied for this purpose, which is designed to analyze the image data (which have a chronological sequence of images, for example) in order to recognize objects. Object information can be determined for each object here. Exemplary object information comprises the position of the object, the size of the object, and/or the type of the object.

The method 500 furthermore comprises assigning 502 at least one object 401 from the set of objects 401, 402, 403, 404, 205 to the signal transmitter 201. The assignment 502 can be carried out on the basis of the image data and/or on the basis of the object information with respect to the individual objects 401, 402, 403, 404, 205. The assignment 502 can be carried out in particular such that (possibly only) one or more objects 401 are assigned, which, with a relatively high probability (for example, of 50% or more), have a distance 411 from the vehicle 100 which deviates by less than a specific value (for example, by 10% or less) from the distance 311 to be determined of the (light) signal transmitter 201.

In the scope of the assignment 502, the one or more objects 401 can therefore be identified from the set of objects 401, 402, 403, 404, 205 which have approximately the same distance 411 from the vehicle 100 as the signal transmitter 201. The assignment 502 can be carried out here on the basis of a machine-trained assignment unit.

The method 500 furthermore comprises ascertaining 503, in particular on the basis of the image data, an individual estimated value of the distance 411 of the assigned object 401 from the vehicle 100. The distance estimation can be carried out on the basis of the optical flow in the chronological sequence of images and/or on the basis of a structure-from-motion method. Alternatively or additionally, the distance estimation can be carried out on the basis of sensor data from one or more further surroundings sensors 103 of the vehicle 100. In particular, a fusion can take place with sensor data of a lidar and/or radar sensor.

Furthermore, the method 500 comprises determining 504 the estimated value of the distance 311 of the light signal transmitter 201 on the basis of the individual estimated value of the distance 411 of the assigned object 401 from the vehicle 100.

The distance of an upcoming signal transmitter 201 can be determined in an efficient and precise manner by way of the measures described in this document. This enables a particularly reliable and robust driving function, in particular a driving function for automated longitudinal guidance, to be provided at a traffic node point 400.

The present invention is not restricted to the exemplary embodiments shown. In particular, it is to be noted that the description and the figures are only intended to illustrate the principle of the proposed methods, devices, and systems.

What is claimed is:

1. An apparatus for determining an estimated value of a distance of a light signal transmitter from a motor vehicle, wherein the apparatus is configured to:

recognize a set of objects in surroundings of the light signal transmitter arranged in a direction of travel in front of the motor vehicle based on image data of a camera of the motor vehicle;

assign an object from the set of objects to the light signal transmitter;

determine an individual estimated value of a distance of the assigned object from the motor vehicle; and determine, based on the image data, an individual estimated value of the distance of the light signal transmitter from the motor vehicle; and determine the estimated value of the distance of the light signal transmitter from the motor vehicle based on the individual estimated value of the distance of the assigned object from the motor vehicle and based on the individual estimated value of the distance of the light signal transmitter from the motor vehicle;

wherein the individual estimated value of the distance of the assigned object from the motor vehicle and the individual estimated value of the distance of the light signal transmitter from the motor vehicle are fused by a machine-learned fusion unit to form the estimated value of the distance of the light signal transmitter from the motor vehicle.

2. The apparatus according to claim 1, wherein the apparatus is configured to assign the object from the set of objects based on a machine-trained assignment unit to the light signal transmitter; and the machine-trained assignment unit includes a trained, artificial neural network.

3. The apparatus according to claim 1, wherein the apparatus is configured to determine the individual estimated value of the distance of the assigned object from the motor vehicle according to a structure-from-motion method based on the image data.

4. The apparatus according to claim 1, wherein the apparatus is configured to:

determine sensor data with respect to the assigned object based on one or more surroundings sensors of the motor vehicle including a lidar sensor and/or a radar sensor; and determine the individual estimated value of the distance of the assigned object from the motor vehicle based on the sensor data of the one or more surroundings sensors.

5. The apparatus according to claim 1, wherein the image data comprise a sequence of chronologically successive images; and the apparatus is configured to:

determine an optical flow on the basis of the sequence of images; and determine the individual estimated value of the distance of the assigned object from the motor vehicle based on the optical flow.

6. The apparatus according to claim 1, wherein the apparatus is configured to:

determine an individual estimated value of the distance of the assigned object from the light signal transmitter; and determine the estimated value of the distance of the light signal transmitter based on the individual estimated value of the distance of the assigned object from the light signal transmitter.

7. The apparatus according to claim 1, wherein the apparatus is configured to longitudinally guide the motor vehicle in an automated manner as a function of the determined estimated value of the distance of the light signal transmitter.

8. The apparatus according to claim 7, wherein the apparatus is configured to:

determine a signaling state of the light signal transmitter based on the image data; and automatically decelerate the motor vehicle as a function of the signaling state in order to bring the motor vehicle to a standstill before the light signal transmitter, or to automatically guide it past the light signal transmitter.

9. The apparatus according to claim 1, wherein the set of objects comprises one or more of:

a ground marking, including a stopping line, in the surroundings of the light signal transmitter;

a traffic sign in the surroundings of the light signal transmitter;

an intersecting lane at a node point at which the light signal transmitter is arranged;

another vehicle standing at the light signal transmitter; and/or a mast, on which the light signal transmitter is fastened.

10. A method for determining an estimated value of a distance of a light signal transmitter from a motor vehicle, the method comprising:

recognizing, based on image data of a camera of the motor vehicle, a set of objects in surroundings of the light signal transmitter arranged in a direction of travel in front of the motor vehicle;

assigning an object from the set of objects to the light signal transmitter;

determining, based on the image data, an individual estimated value of the distance of the assigned object from the motor vehicle;

determining, based on the image data, an individual estimated value of the distance of the light signal transmitter from the motor vehicle; and determining the estimated value of the distance of the light signal transmitter from the motor vehicle based on the individual estimated value of the distance of the assigned object from the motor vehicle and based on the individual estimated value of the distance of the light signal transmitter from the motor vehicle;

wherein the individual estimated value of the distance of the assigned object from the motor vehicle and the individual estimated value of the distance of the light signal transmitter from the motor vehicle are fused by a machine-learned fusion unit to form the estimated value of the distance of the light signal transmitter from the motor vehicle.

* * * * *